United States Patent
Toillon et al.

(10) Patent No.: US 9,946,580 B2
(45) Date of Patent: Apr. 17, 2018

(54) MULTI-CORE PROCESSOR SYSTEM FOR INFORMATION PROCESSING

(71) Applicant: THALES, Neuilly sur Seine (FR)

(72) Inventors: Patrice Toillon, Meudon la Foret (FR); Hicham Agrou, Meudon la Foret (FR)

(73) Assignee: THALES, Neuilly sur Seine (FR)

( * ) Notice: Subject to any disclaimer, the term of this patent is extended or adjusted under 35 U.S.C. 154(b) by 144 days.

(21) Appl. No.: 14/654,021

(22) PCT Filed: Dec. 18, 2013

(86) PCT No.: PCT/EP2013/077093
§ 371 (c)(1),
(2) Date: Jun. 19, 2015

(87) PCT Pub. No.: WO2014/096003
PCT Pub. Date: Jun. 26, 2014

(65) Prior Publication Data
US 2015/0347195 A1 Dec. 3, 2015

(30) Foreign Application Priority Data
Dec. 20, 2012 (FR) .................................. 12 03525

(51) Int. Cl.
*G06F 9/46* (2006.01)
*G06F 9/52* (2006.01)

(52) U.S. Cl.
CPC ................ *G06F 9/52* (2013.01); *G06F 9/468* (2013.01)

(58) Field of Classification Search
None
See application file for complete search history.

(56) References Cited

U.S. PATENT DOCUMENTS

| | | | | |
|---|---|---|---|---|
| 7,281,249 B2* | 10/2007 | Tarui | ..................... | G06F 9/5077 370/218 |
| 8,533,716 B2* | 9/2013 | Lippett | ................. | G06F 9/4812 710/22 |
| 8,990,831 B2* | 3/2015 | Elnozahy | .................. | G06F 9/54 718/106 |
| 2004/0158766 A1* | 8/2004 | Liccione | ............. | G06F 11/2023 714/4.11 |
| 2005/0015621 A1* | 1/2005 | Ashley | ................ | H04L 63/0227 726/4 |

(Continued)

OTHER PUBLICATIONS

Colmenares et al., "Resource Management in the Tessellation Manycore OS", Retrieved from the Internet: http://static.usenix.org/event/hotpar10/tech/full_papers/Colmenares.pdf, 2010.

(Continued)

*Primary Examiner* — Mehran Kamran
(74) *Attorney, Agent, or Firm* — Thompson Coburn LLP

(57) ABSTRACT

This multi-core processor system for processing information, of the kind including a data exchange engine (2) associated with multiple users (3) of shared resources (4), is characterized in that it includes means for controlling data exchanges in the processor, associated with each user (3), with the exchange engine (2) and with the shared resources (4) and defining at the processor, a data exchange law determined according to a defined space-time mapping, a giving the possibility of obtaining predictable operating performances of this processor.

11 Claims, 2 Drawing Sheets

(56) References Cited

U.S. PATENT DOCUMENTS

| | | | | |
|---|---|---|---|---|
| 2005/0187867 A1* | 8/2005 | Sokolic | G06F 17/30899 | 705/39 |
| 2005/0223382 A1* | 10/2005 | Lippett | G06F 9/4812 | 718/103 |
| 2006/0101470 A1* | 5/2006 | Swanberg | G06F 9/5077 | 718/105 |
| 2007/0204268 A1* | 8/2007 | Drepper | G06F 9/461 | 718/102 |
| 2008/0134185 A1* | 6/2008 | Fedorova | G06F 9/4881 | 718/102 |
| 2008/0141267 A1* | 6/2008 | Sundaram | G06F 9/52 | 718/106 |
| 2009/0222832 A1* | 9/2009 | Sultenfuss | G06F 9/5005 | 718/104 |
| 2010/0043009 A1* | 2/2010 | Marchand | G06F 9/4881 | 718/104 |
| 2010/0199280 A1* | 8/2010 | Vestal | G06F 9/4881 | 718/102 |
| 2011/0179057 A1* | 7/2011 | Wojcik | G06F 17/30306 | 707/769 |
| 2012/0117353 A1* | 5/2012 | Armstrong | G06F 12/1475 | 711/173 |
| 2012/0216193 A1* | 8/2012 | Lee | G06F 9/45558 | 718/1 |
| 2012/0297395 A1* | 11/2012 | Marchand | G06F 9/5027 | 718/104 |
| 2013/0081045 A1* | 3/2013 | Jeong | G06F 9/5083 | 718/104 |
| 2013/0085996 A1* | 4/2013 | Tian | G06F 17/30368 | 707/648 |
| 2013/0219396 A1* | 8/2013 | Kasravi | G06Q 40/00 | 718/101 |
| 2013/0227238 A1* | 8/2013 | Vijverberg | G06F 9/5077 | 711/170 |
| 2014/0229957 A1* | 8/2014 | Zhang | G06F 9/546 | 719/314 |
| 2015/0040131 A1* | 2/2015 | Shan | G06F 9/5027 | 718/1 |
| 2015/0058617 A1* | 2/2015 | Oishi | G06F 9/5094 | 713/100 |

OTHER PUBLICATIONS

Craveiro et al., "Architecture, Mechanisms and Scheduling Analysis Tool for Multicore Time- and Space-Partitioned Systems", Retrieved from the Internet: http://beru.univ-brest.fr/~singhoff/publications/files/craveiroll.pdf, Jul. 2007.

Cullmann et al., "Predictability Considerations in the Design of Multi-Core Embedded Systems", Retrieved from the Internet: http://citeseerx.ist.psu.edu/viewdoc/download?doi=10.1.1.172.4533&rep=rep1&type=pdf, 2010.

Windsor et al., "Tiem and Space Partitioning in Spacecraft Avionics", Third IEEE International Conference on Space Mission Challenges for Information Technology, 2009, pp. 13-20.

* cited by examiner

MULTI-CORE PROCESSOR SYSTEM FOR INFORMATION PROCESSING

CROSS-REFERENCE TO RELATED APPLICATIONS

This application is a U.S. National Phase application of PCT/EP2013/077093, filed on Dec. 18, 2013, which claims the benefit of French Application No. 12 03525, filed Dec. 20, 2012, both of which are incorporated herein by reference in their entireties.

FIELD OF THE INVENTION

The present invention relates to a multi-core processor system for processing information.

By multi-core processor system, all multiple systems of this nature, for example i.e. multi-processor systems, . . . , wherein similar problems are posed, should be encompassed in the present application.

BACKGROUND OF THE INVENTION

Multi-core processor systems of this kind are already known in the state of the art, which include a data exchange engine associated with multiple users of shared resources.

As an example, the shared resources may include memory means, data input and/or output ports, external processing units, computers, etc.

The users may also include many kinds of means of this nature.

This multi-core processor structure for example finds applications in the field of on-board avionics.

But other applications are, of course, possible.

Design of present systems is such that any user may request and access any shared resource and this at any time and under any condition.

Thus for example, situations may occur in which a multitude of users wishes to access at the same time the same shared resources of the system.

It is then conceivable that this is expressed by difficulties and access limitations which may be expressed by slowing down periods of the operation of the whole and especially by lack of control of the maximum access times or for accessing part of them.

The operation of such a system of the state of the art is therefore impossible to control.

Now, in such applications, it is extremely important to be able to control the operation of such systems.

SUMMARY OF THE INVENTION

The object of the invention is therefore to solve these problems.

For this purpose, the object of the invention is a multi-core processor system for processing information of the kind including a data exchange engine associated with multiple users of shared resources, characterized in that it includes means for controlling data exchange in the processor, associated with each user, with the exchange engine and with the shared resources and defining at the processor, a data exchange law determined according to a defined space-time mapping, giving the possibility of obtaining predictable operating performances of this processor.

According to other features of the system in accordance with the invention, taken alone or as a combination:

each user is associated with means for filtering his/her information exchanges with the exchange engine;
the shared resources are associated with means for managing the data inputs/outputs in the latter;
the space-time mapping is fixed;
the space-time mapping is programmable;
the users include elements selected from the group comprising:
  data input/output ports,
  external processing units,
  external processor system(s),
  data transfer units,
  local or remote information processing units,
  processors,
  computers,
  sensors,
  actuators, and
  display devices;
  virtual users.
the shared resources include:
  memory means,
  data input/output ports,
  external processing units,
  external processor system(s),
  data transfer units,
  local or remote information processing units,
  processors,
  computers,
  sensors,
  actuators, and
  display devices;
  virtual resources.
space-time mapping is established from space-time partitioning of user accesses to the exchange engine and/or to the shared resources;
space-time mapping is established from quotas for user space-time accesses to the exchange engine and/or to the shared resources;
space-time mapping is established from attributes of user accesses to the exchange engine and/or to the shared resources;
it includes means for supervising and generating and storing information on the traceability of the exchanges in the engine;
the means for storing traceability information on the exchanges in the engine are accessible from the outside of the latter, in order to allow analysis of its operation;
the supervision and generation and storage means may be configured from the outside so as to allow targeted observation from the outside;
it includes integrated means for self-controlling proper operation.

BRIEF DESCRIPTION OF THE DRAWINGS

The invention will be better understood upon reading the description which will follow, only given as an example and made with reference to the appended drawings, wherein.

DETAILED DESCRIPTION OF THE INVENTION

Figure 1:
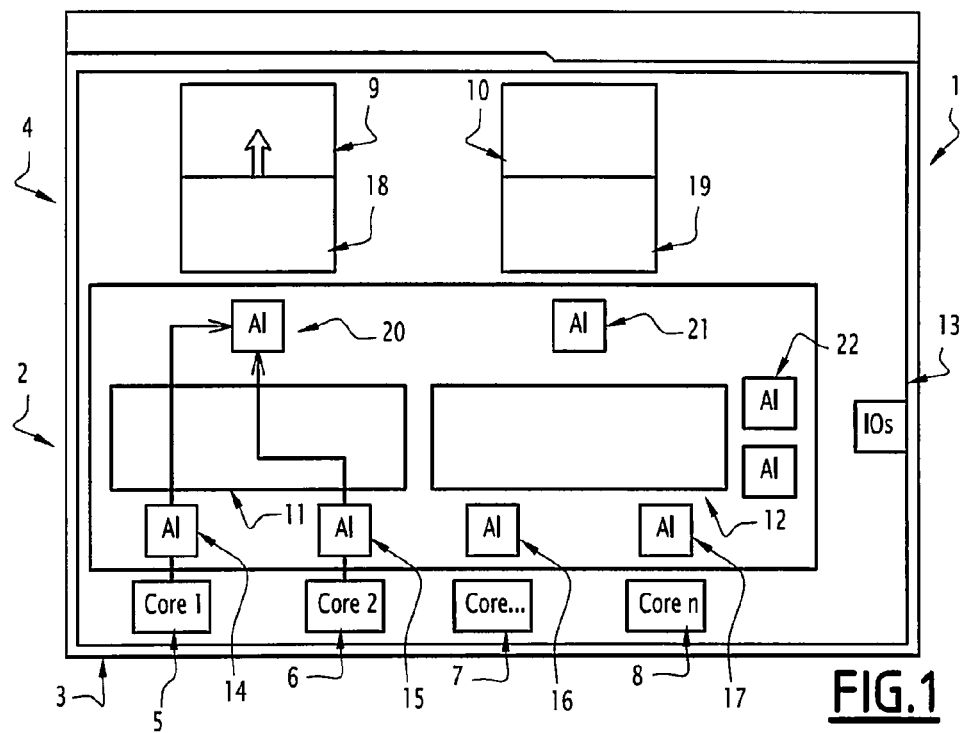
FIG. 1 represents a block diagram illustrating the general structure of an information processing processor system according to the invention.

A multi-core processor system for processing information, in particular for highly performing processing systems, requiring controlled time behavior, i.e. for which the upper processing limits may be computed, is actually illustrated in these figures and particularly in FIG. 1.

Such a system finds many applications, for example in the field of on-board avionics or other.

This system is designated by the general reference 1 and includes a data exchange engine, designated by the general reference 2, associated with multiple users of shared resources.

Figure 2:
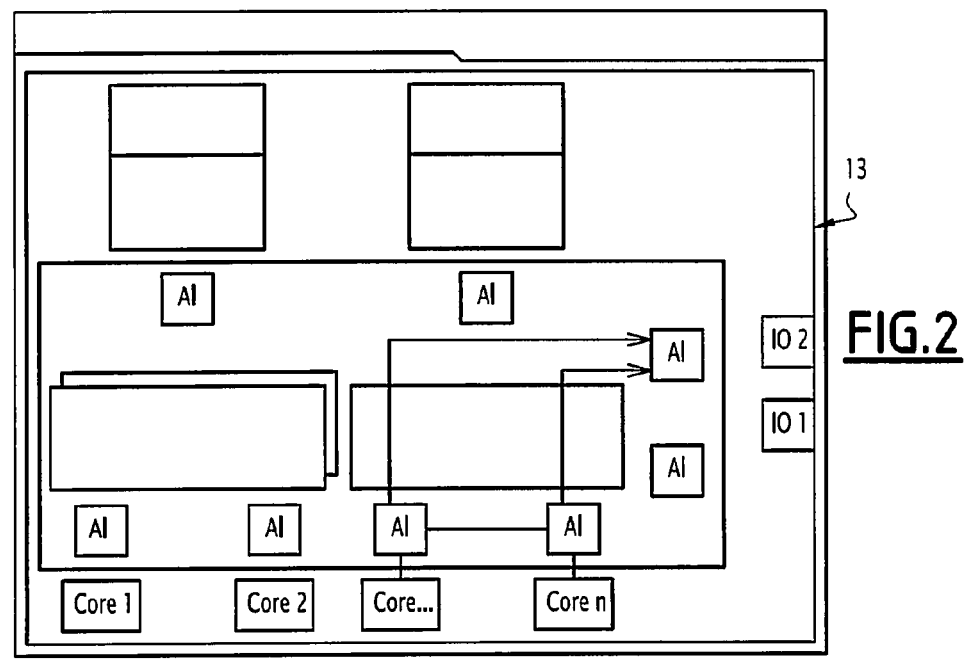
FIG. 2 represents a block diagram illustrating an alternative embodiment of a system according to the invention.

In the exemplary embodiment illustrated in these FIGS. 1 and 2, the multiple users are designated by the general reference 3, while the shared resources are designated by the general reference 4.

In fact, the users 3 as described earlier, may include a certain number of elements for example comprising data input and output ports, external processing units, external processor system(s), data transfer units, local or remote information processing units, processors, computers, sensors, actuators or further display devices, adapted so as to be connected to this multi-core processor system.

In the example illustrated in these FIGS. 1 and 2, these multiple users for example include inter alia multiple processor cores, these cores being for example designated by references 5, 6, 7 and 8, in these figures.

These multiple users may also designate virtual users such as virtual machines, operating systems, partitions, software systems . . . .

The shared resources designated by the general reference 4 in these figures, also include means of different kinds.

In the exemplary embodiment illustrated in these FIGS. 1 and 2, these shared resources comprise memory means and in particular two memories or two memory spaces, designated by references 9 and 10 in these figures, for example associated with sub-domains of the processor system, designated by references 11 and 12.

Of course, other shared resources such as for example data outputs, external processing units, external processor systems, data transfer units, local or remote information processing units, processors, computers, actuators, and display devices, may also be contemplated.

These resources may also designate virtual resources such as virtual machines, operating systems, partitions, the software systems . . . .

As this is illustrated in these FIGS. 1 and 2, data input and output ports such as those designated by the general reference 13 in these figures, may also be contemplated.

In order to solve the different problems described earlier relating to controlling its operation, the multi-core processor system according to the invention includes a means for controlling data exchanges in the processor, associated with each user, with the exchange engine and with the shared resources and defining at the processor, a data exchange law determined according to defined space-time mapping, giving the possibility of obtaining predictable operating performances of this processor.

For example it is in this way, as illustrated in these figures, that the different users are each associated with means for filtering the information exchanges of the latter with the exchange engine. In the present description, it should be noted that the expression of filtering means should be understood as grouping means not only ensuring filtering functions, strictly speaking, but also policing functions as well known in the art.

Thus, for example, the processor cores 5, 6, 7 and 8 are associated with means 14, 15, 16 and 17 respectively, for filtering their accesses and their exchanges with the exchange engine.

Means with shared resources such as the memory means 9 and 10, are, as for them, each associated with a memory controller like those designated by references 18 and 19 in these figures and with means for managing data inputs/outputs in or of the means with shared resources.

These input/output managing means are designated by references 20 and 21 in these figures.

The data input and output ports may also be associated with the corresponding the filtering/management means like the filtering/management means designated by general reference 22 in these figures.

These means 22 may then have filtering and/or managing structures as described earlier depending on the nature of the users connected to the latter.

This space-time mapping which allows determination of a data exchange law in the processor, may then be established from space-time partitioning of the user accesses to the exchange engine and/or to the shared resources.

This mapping may also be established from user space-time quotas for accessing the exchange engine and/or the shared resources.

Also, the latter may be established from attributes of the user accesses to the exchange engine and/or to the shared resources.

This then allows control of the exchanges in the processor system for allowing control of its operation and allowing it to have predictable operating performances.

Indeed, by controlling the different data exchanges in the processor, it is possible to control <<the workload>> or the load of the data transactions/accesses including their densities (number of accesses per unit time and/or number of accesses per access area) of the latter and therefore control and predict its operating performances.

It will also be noted that the space-time mapping described earlier may for example be fixed or programmable according to circumstances.

Figure 3:
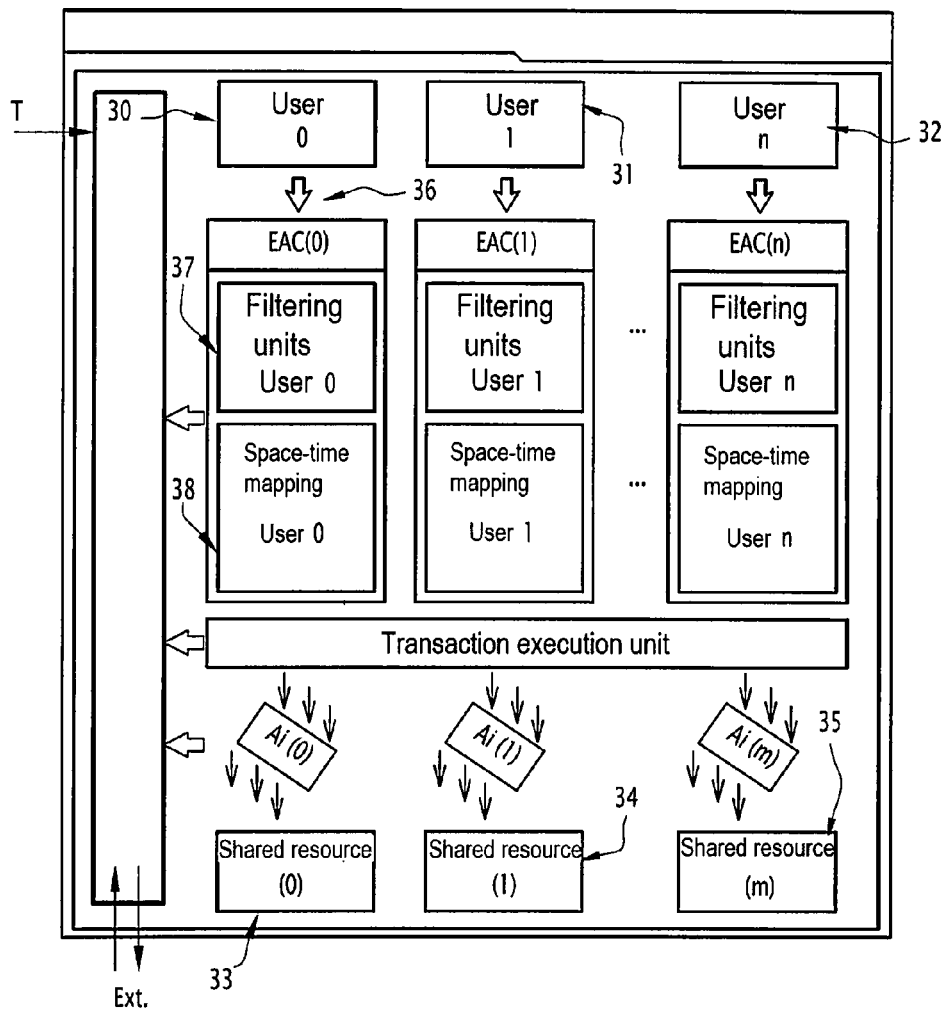
FIG. 3 represents a detailed view of data exchange control means entering the structure of a processor system according to the invention.

The means for controlling data exchanges in the processor are also illustrated in another way in FIG. 3.

Thus, for example, in this FIG. 3, the users are designated by references 30, 31 and 32, while the shared resources are designated by references 33, 34 and 35.

Each user request such as the request designated by the general reference 36, for example emitted by the user 30, then passes through a corresponding filtering unit 37 and a unit for managing accesses to the shared resources according to a corresponding space-time mapping, this management unit being designated by the general reference 38. The filtering unit may be configured depending on the retained traffic profiles for each of the users.

Of course, the processor system according to the invention may include additional means such as for example means for supervising and generating and storing the traceability information on the exchanges in the exchange engine.

These supervision and generation and storage means may then be configured from the outside so as to allow targeted observation from the outside.

The observations made are dated and for example have all the same time.

The means for storing traceability information of the exchanges in the engine may then for example be accessible from the outside of this system, so as to allow analysis of its operation.

Also, means for self-controlling the proper operation of the system may be integrated into the latter.

Such a structure may then be applied for allowing users to access the shared resources in a same field or even in different fields, as this emerges from FIGS. 1 and 2.

Each transaction inside the system is then control the in order to determine whether the latter observes a transaction insertion contract as set by the control means.

In the case of observance of this contract, the transaction is then validated whereas in the opposite case, the latter is invalidated with generation of a context allowing external observance via the supervision means.

These supervision means cover normal events for which the transaction is validated and abnormal events for which the transaction is invalidated.

Of course, other embodiments may still be contemplated.

The invention claimed is:

1. A multi-core processor system for processing information, the multi-core processor system comprising:
    a data exchange engine associated with multiple users of shared resources;
    a processor;
    a plurality of memory devices configured for memorizing the shared resources, each memory device being associated with a memory controller and with data inputs/outputs ports, the data inputs/outputs ports being associated with the data exchange engine; and
    a controlling device for controlling data exchanges in the multi-core processor system and notably between the users and the data exchange engine and between the users and the plurality of memory devices, wherein the controlling device is integrated in the data exchange engine and comprises, for each user, a respective filtering unit, configured depending on a retained traffic profile for each user, for filtering information exchanges with the user and a managing unit for managing user accesses to the shared resources, the controlling device, defining at the processor, a data exchange law determined according to a fixed defined space-time mapping, to obtain predictable operating performances of the processor.

2. The processor system according to claim 1, wherein the space-time mapping is programmable.

3. The processor system according to claim 1, wherein the users comprise elements selected from the group consisting of data input/output ports, external processing units, external processor system(s), data transfer units, local or remote information processing units, processors, computers, sensors, actuators, display devices, virtual users, and combinations thereof.

4. The processor system according to claim 1, wherein the shared resources are selected from the group consisting of memory, data input/output ports, external processing units, external processor system(s), data transfer units, local or remote information processing units, processors, computers, sensors, actuators, display devices, virtual resources, and combinations thereof.

5. The processor system according to claim 1, wherein the space-time mapping is established from space-time partitioning of the accesses of the users to the data exchange engine and/or to the shared resources.

6. The processor system according to claim 1, wherein the space-time mapping is established from user access space-time quotas of the users to the data exchange engine and/or to the shared resources.

7. The processor system according to claim 1, wherein the space-time mapping is established from access attributes of the users to the data exchange engine and/or to the shared resources.

8. The processor system according to claim 1, further comprising a supervising unit for supervising and generating and storing traceability information of the exchanges in the date exchange engine.

9. The processor system according to claim 8, wherein the supervising unit is accessible from the outside of the processor system, in order to allow analysis of its operation.

10. The processor system according to claim 8, wherein the supervising unit may be configured from the outside to allow targeted observation from the outside.

11. The processor system according to claim 1, further comprising integrated self-controlling unit for self-controlling proper operation of the processor system.

* * * * *